United States Patent

Matsumoto

(10) Patent No.: US 9,482,273 B2
(45) Date of Patent: Nov. 1, 2016

(54) LINEAR GUIDE DEVICE

(71) Applicant: NSK Ltd., Shinagawa-ku, Tokyo (JP)

(72) Inventor: Jun Matsumoto, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/649,253

(22) PCT Filed: Dec. 2, 2013

(86) PCT No.: PCT/JP2013/007061
§ 371 (c)(1),
(2) Date: Jun. 3, 2015

(87) PCT Pub. No.: WO2014/087632
PCT Pub. Date: Jun. 12, 2014

(65) Prior Publication Data
US 2015/0316096 A1 Nov. 5, 2015

(30) Foreign Application Priority Data

Dec. 4, 2012 (JP) ................................ 2012-265506

(51) Int. Cl.
| | |
|---|---|
| *F16C 29/08* | (2006.01) |
| *F16C 29/04* | (2006.01) |
| *F16C 29/00* | (2006.01) |
| *F16C 29/06* | (2006.01) |

(52) U.S. Cl.
CPC ........... *F16C 29/086* (2013.01); *F16C 29/005* (2013.01); *F16C 29/04* (2013.01); *F16C 29/0633* (2013.01)

(58) Field of Classification Search
CPC .... F16C 29/04; F16C 29/06; F16C 29/0633; F16C 29/086; F16C 33/78; F16C 33/7823

USPC ............................ 384/13, 15, 43–45, 54, 59
See application file for complete search history.

(56) References Cited

U.S. PATENT DOCUMENTS

| 5,149,204 A | 9/1992 | Tennichi | |
|---|---|---|---|
| 7,740,406 B2 * | 6/2010 | Kakei | F16C 29/0635 384/13 |

(Continued)

FOREIGN PATENT DOCUMENTS

| DE | 4331013 A1 * | 2/1995 | |
|---|---|---|---|
| DE | 102005003874 A1 * | 8/2006 | F16C 29/0645 |

(Continued)

OTHER PUBLICATIONS

Chinese-language Office Action issued in counterpart Chinese Application No. 201380001865.3 dated Oct. 10, 2015 with English translation (Eight (8) pages).

(Continued)

*Primary Examiner* — Marcus Charles
(74) *Attorney, Agent, or Firm* — Crowell & Moring LLP

(57) ABSTRACT

A side seal included in a linear guide device of the present disclosure has one or a plurality of seals, and the seals each have a lip portion, and a holder plate made of hard resin configured to the lip portion and to be mounted on a slider. The holder plate has a thickness retention portion configured to retain plate thickness, and a thin portion that is thinner than and has a lower rigidity than the thickness retention portion. The thickness retention portion is formed along at least the portion of an outer edge of the holder plate where there is not the portion. The thin portion is blocked by the thickness retention portion from the outside.

6 Claims, 9 Drawing Sheets

(56) References Cited

U.S. PATENT DOCUMENTS

| | | | |
|---|---|---|---|
| 8,403,562 B2* | 3/2013 | Geka | F16C 29/065 384/13 |
| 9,051,966 B2* | 6/2015 | Matsumoto | F16C 29/086 |
| 2002/0027044 A1* | 3/2002 | Michioka | B23Q 11/0875 184/5 |
| 2007/0223845 A1* | 9/2007 | Kakei | F16C 29/0635 384/15 |
| 2009/0052815 A1* | 2/2009 | Kakei | F16C 29/0609 384/7 |
| 2009/0245701 A1 | 10/2009 | Ogura et al. | |
| 2013/0142458 A1 | 6/2013 | Nakagawa | |
| 2013/0195386 A1 | 8/2013 | Matsumoto et al. | |
| 2013/0251291 A1 | 9/2013 | Arai | |

FOREIGN PATENT DOCUMENTS

| | | |
|---|---|---|
| JP | 8-247144 A | 9/1996 |
| JP | 2007-211900 A | 8/2007 |
| JP | 2009-236192 A | 10/2009 |
| JP | 2012-41986 A | 3/2012 |
| JP | 2012-52609 A | 3/2012 |
| WO | WO 2012/070185 A1 | 5/2012 |

OTHER PUBLICATIONS

International Search Report (PCT/ISA/210) dated Jan. 14, 2014, with English translation (three (3) pages).

Japanese-language Written Opinion (PCT/ISA/237) dated Jan. 14, 2014 (four (4) pages).

Taiwanese-language Office Action issued in counterpart Taiwanese Application No. 102144430 dated Dec. 9, 2015 with English translation (Nine (9) pages).

European Search Report issued in counterpart European Application No. 13860744.5 dated Mar. 24, 2016 (fourteen (14) pages).

International Preliminary Report on Patentability (PCT/IB/338 & PCT/IB/373) dated Jun. 18, 2015 and English translation of Japanese-language Written Opinion (PCT/ISA/237) previously filed on Jun. 3, 2015 (seven (7) pages).

* cited by examiner

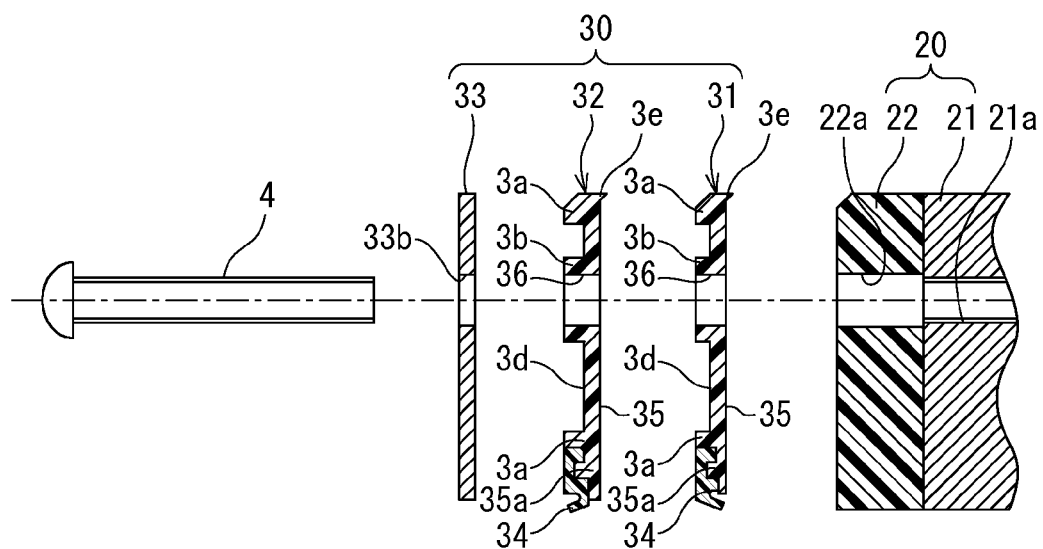
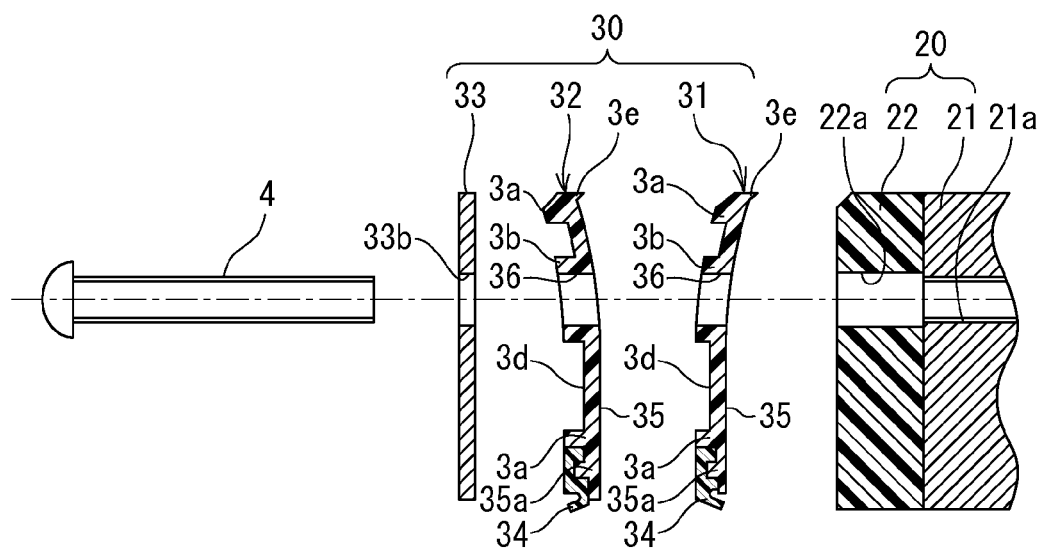

LINEAR GUIDE DEVICE

CROSS REFERENCE TO RELATED APPLICATIONS

This application is the U.S. national stage of International Application PCT/JP2013/007061, filed Dec. 2, 2013, which claims priority under 35 U.S.C. §119 to Japanese Patent Application 2012-265506, filed Dec. 4, 2012.

TECHNICAL FIELD

The present disclosure relates to a linear guide device that characterized by a side seal.

BACKGROUND ART

Linear guide devices are equipped with a guide rail, a slider, and a plurality of rolling elements. The guide rail and the slider have rolling contact surfaces that are arranged to face each other and form a rolling passage for the rolling elements, and the slider moves linearly with respect to the guide rail via the rolling elements that roll in the rolling passage.

In the related-art linear guide devices, a side seal having a lip portion in sliding contact with on the guide rail and is made of rubber is arranged at each of both ends of the slider in a motion direction. This prevents foreign matter from entering the inside of the slider from both ends of the slider in the motion direction.

As a related-art example of the side seals of the linear guide devices, there is a side seal in which a seal member made of rubber is fixed to a metal plate. The seal member includes a base portion and a lip portion, the base portion is fixed to the metal plate by welding, and the lip portion protrudes from the metal plate to the guide rail side. The side seal is used by bringing the lip portion of the seal member into contact with an upper surface and both side surfaces of the guide rail.

PTL 1 discloses independently attaching a plurality of side seals, in which a seal member made of rubber is fixed to a metal plate, to a slider with a screw member.

PTL 2 discloses a seal member, a holder plate configured to hold the seal member, and a side seal having a cover, as components. The seal member is held by one surface of the holder plate by fitting of a protrusion and a recess, and the cover covers the one surface of the holder plate. That is, this side seal is fixed to the slider in a state where the seal member is sandwiched by the holder plate and the cover.

A plurality of the same covers and a plurality of the same holder plates are prepared. A plurality of types of the seal members (seal members that are different from each other in at least any one of the inclination, material, thickness, and tip shape of the lip portion) are prepared. A plurality of suitable seal members are selected from these seal members, and a side seal is assembled by combining them with the same number of covers and holder plates. Accordingly, the sealing performance exhibited by the side seal is able to be improved by changing the seal function of the side seal depending on the purpose.

CITATION LIST

Patent Literature

PTL 1: JP 2012-41986 A
PTL 2: WO 2012/070185

SUMMARY OF INVENTION

Technical Problem

In the side seal used by combining the seal member, the holder plate, and the cover that are separately formed as in the side seal described in PTL 2, generally, the cover is made of hard materials, such as metal, the holder plate is made of hard resins, such as polyacetal resin and nylon, and the seal member is made of soft resins, such as rubber and polyester-based elastomer. Generally, since the holder plate is manufactured by injection molding of hard resin, the holder plate is warped due to contraction deformation at the time of injection molding.

In the side seal described in PTL 2, when the seal member is sandwiched by the holder plate and the cover and then the holder plate is attached to the slider such that the holder plate faces the slider, the warp of the holder plate may form a gap between the slider and the side seal. Additionally, when a side seal, in which a plurality of seals in which the seal member is held by the holder plate overlap each other and one cover is arranged on the outside of the seals, is attached to the slider, a gap may also be formed between the plurality of seals if the holder plates have warps, respectively.

If such a gap is formed in an outer peripheral surface (exposed surface in the state of being attached to the slider) of the side seal, there is a concern that foreign matter may enter the inside of the slider via this gap or lubricant inside the slider may leak to the outside via this gap. Particularly, in the case of the side seal having the plurality of seals, the warps of the holder plates affect each other. Therefore, a gap is easily generated between the holder plates, and the seal function is apt to degrade.

An object of the present disclosure is to enable a seal function of a side seal to be normally exhibited in a usage state, even when a holder plate made of hard resin has a warp resulting from a manufacturing error, in a linear guide device equipped with the side seal having a seal in which a seal member (lip portion) is held by the holder plate.

Solution to Problem

In order to solve the above problems, a linear guide device according to one aspect of the present discloser is characterized by having the following configuration (1) to (6).

(1) The linear guide device includes a guide rail, a slider, and a plurality of rolling elements. The guide rail and the slider have rolling contact surfaces that are arranged to face each other and form a rolling passage for the rolling elements. The slider is configured to move linearly with respect to the guide rail via the rolling elements that roll in the rolling passage. A side seal having a lip portion in sliding contact with on the guide rail is arranged at each of both ends of the slider in a motion direction.

(2) The side seal has one or a plurality of seals.

(3) The seal has the lip portion, and a holder plate (holding part) made of hard resin configured to hold the lip portion and to be mounted on the slider.

(4) The holder plate has a thickness retention portion configured to retain plate thickness, and a thin portion that is thinner and has a lower rigidity than the thickness retention portion.

(5) The thickness retention portion is formed along at least the portion of an outer edge of the holder plate where there is not the lip portion.

(6) The thin portion is blocked by the thickness retention portion from the outside.

In the linear guide device having the above configurations (1) to (3), if a warp resulting from a manufacturing error is caused in the holder plate of the side seal before the side seal is mounted to the slider, a gap is formed between the holder plate and the slider or between the holder plates, and a seal function is apt to degrade. The linear guide device of this aspect has the above configuration (4), whereby the warp is corrected after the side seal is mounted to the slider. Additionally, the linear guide device of this aspect has the above configurations (5) to (6), whereby a gap is not easily formed between the holder plate and the slider or between the holder plates.

In addition, materials that constitute the lip portion, include soft resins, such as polyester-based elastomer, nitrile rubber, acrylic rubber, silicone rubber, and fluororubber. Hard resins that constitute the holder plate include polyacetal resin (POM), polyamide (nylon, PA), polybutylene terephthalate (PBT), polyetheretherketone (PEEK), polyphenylene sulfide (PPS), and the like.

In the linear guide device of this aspect, when the holder plate has a hole through which a fixing screw for fixing the seal to the slider is inserted, it is preferable that a thickness retention portion configured to retain the thickness of the holder plate is also formed around the hole. As the thickness retention portion is formed around the hole, a gap between the holder plate and a member (the holder plate, the slider, or the like) adjacent thereto is blocked by the thickness retention portion around the hole. Therefore, even if there is foreign matter in a space formed by the thin portion and a member adjacent to the holder plate, it is possible to prevent the foreign matter from moving to the inside of the slider through the hole.

If the thickness retention portion around the hole has the same thickness as the thickness retention portion at the outer edge and is formed in an annular shape configured to surround the entire circumference of the hole, a gap between the holder plate and a member adjacent thereto is blocked by the thickness retention portion at the entire circumference of the hole. Therefore, the effect of preventing the foreign matter from moving through the hole is improved.

Additionally, if the thickness retention portion around the hole has the same thickness as the thickness retention portion at the outer edge, and is formed in a shape configured to partially surround the circumference of the hole, major deformation does not occur around the hole even when the fixing screw is strongly fastened. Therefore, there is an advantage that management of the fastening torque of the fixing screw becomes simple.

The linear guide device of this aspect is able to have the following configuration (7).

(7) The holder plate and the lip portion are separately formed. The lip portion is held by a lip attachment portion formed at the edge of the holder plate near the guide rail. The thickness retention portion is formed along the lip attachment portion and inside the lip attachment portion at the edge of the holder plate where there is the lip attachment portion.

If the linear guide device of this aspect has the configuration (7), the thickness retention portion is formed along the lip portion. Therefore, the lip portion is not crushed with an excessive pressure. Additionally, even if there is foreign matter in the thin portion, movement of foreign matter is prevented by the thickness retention portion along the lip portion. Therefore, damage to the lip portion is suppressed.

The linear guide device of this aspect is able to have the following configuration (8).

(8) The side seal has one or a plurality of seals and a cover. The cover includes a plate of a hard material and is arranged at a position farther from the slider than the seal. The side seal is fixed to the slider with a fixing screw that passes through the cover and the seal and is screwed to the slider.

Accordingly, even if warp is caused in the seal, the warp of the seal is corrected by a fastening force of the fixing screw, and the seals or the seal and another member are brought into close contact with each other.

It is preferable that the side seal has a plurality of the seals, and the seals are arranged so as to come into contact with each other in the motion direction of the slider. Accordingly, since the side seal has the plurality of lip portions, the sealing performance of the side seal is improved as compared to a case where the side seal has the one seal.

It is preferable that the linear guide device of this aspect has the following configuration (9).

(9) The thickness retention portion and the thin portion are formed by forming a recess in one surface of two surfaces of the holder plate perpendicular to the motion direction of the slider, and the other surface is a flat surface. That is, the thickness retention portion is formed in a convex shape with respect to a reference plane (a plane between the above two surfaces), and the thin portion is formed in a concave shape.

Accordingly, only one surface of the holder plate has a protrusion and a recess. Thus, as compared to a side seal having a holder plate in which both surfaces have protrusions and recesses, respectively, a gap is not easily formed between the holder plate and another member adjacent thereto, and thereby the sealing performance of the side seal is improved.

It is preferable that the linear guide device of this aspect is able to have the above configuration (9) and the following configuration (10).

(10) A projection that protrudes in a direction separated from the flat surface is provided along an outer edge of the flat surface of the holder plate.

Accordingly, since a gap between the holder plate and another adjacent member is blocked by the projection along the edge, the sealing performance of the side seal is improved as compared to a side seal that has the above configuration (9) but does not have the above configuration (10).

Advantageous Effects of Invention

According to the linear guide device of the present disclosure, even when the holder plate of the side seal has a warp resulting from a manufacturing error before the side seal is mounted to the slider, the warp is corrected after the side seal is mounted to the slider. Therefore, the seal function of the side seal is able to be normally exhibited.

BRIEF DESCRIPTION OF DRAWINGS

FIG. 7 is a cross-sectional view illustrating a method of fixing the side seal to the slider in the first embodiment;

FIG. 8 is a cross-sectional view illustrating a case where there is a warp in a holder plate when the side seal is fixed to the slider in the first embodiment;

DESCRIPTION OF EMBODIMENTS

FIGS. 1 to 9 illustrate a first embodiment of the present disclosure. In these drawings, illustration of portions that are widely known as the structure of a linear guide device and do not have a direct relationship to the present disclosure, for example, rolling elements, a return passage for the rolling elements, and the like are omitted.

Figure 1:
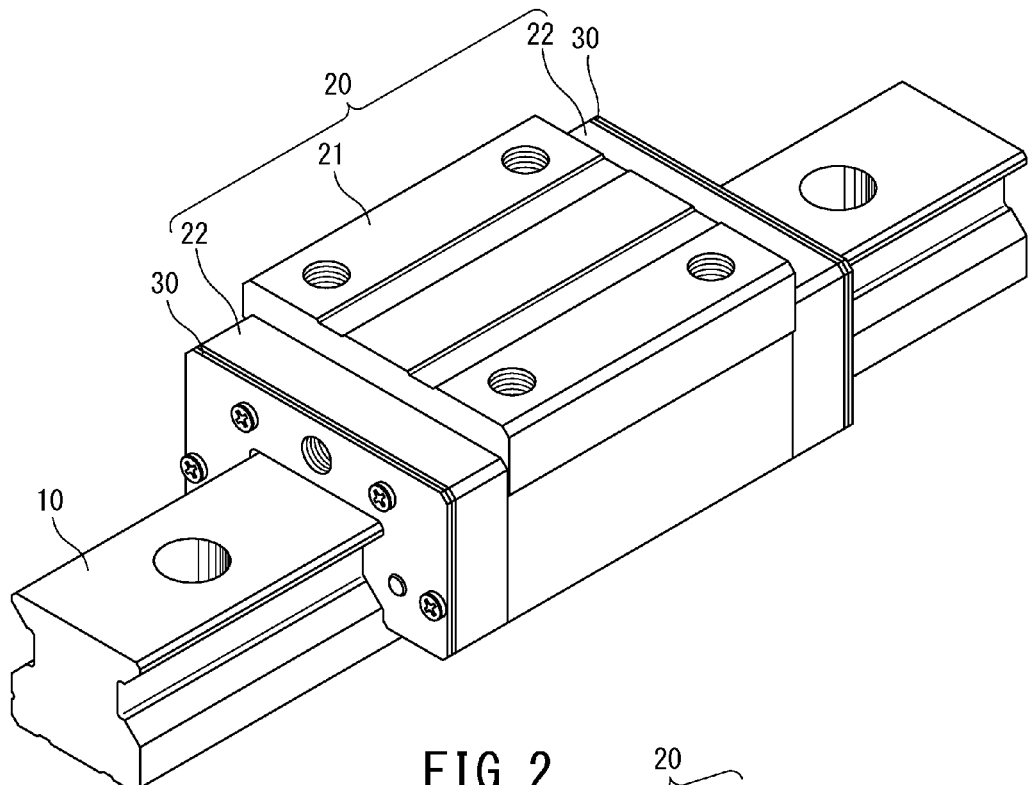
FIG. 1 is a perspective view illustrating an entire linear guide device of a first embodiment of the present disclosure.

As illustrated in FIG. 1, a linear guide device of the first embodiment includes a guide rail 10, a slider 20, and a side seal 30. The slider 20 includes a slider body 21 configured to hold a number of rolling elements (not illustrated) therein, and an end cap 22 having a direction change path for the rolling elements. End caps 22 are arranged at both ends of the slider body 21 in an axial direction (a longitudinal direction of the guide rail or a slider motion direction). The side seal 30 is arranged at a shaft end portion of the end cap 22.

In many examples, the linear guide device is used by arranging the guide rail 10 on a horizontal plane and arranging the slider 20 so as to surround an upper surface and both side surfaces of the guide rail 10. That is, in many cases, the guide rail 10 is arranged such that the longitudinal direction and a width direction (left-right direction) of the guide rail are along the horizontal direction.

Therefore, even in this embodiment, the longitudinal direction (axial direction), an up-down direction, and a left-right direction will be described along this example. Accordingly, when an installation method of a linear guide device is different from this example, and a change, such as inclination, is added to the longitudinal direction, the up-down direction, or the left-right direction of the guide rail 10, the directions or inclination of respective portions are interpreted according to the posture of the guide rail.

Figure 2:
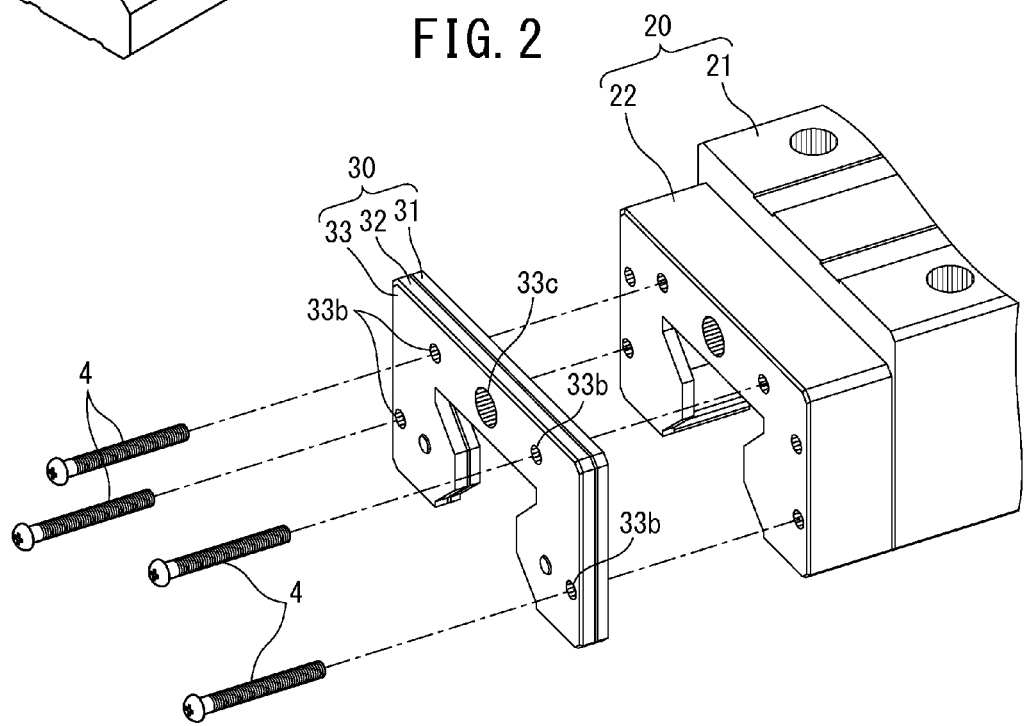
FIG. 2 is a perspective view illustrating a state where a side seal is removed from a slider, in the linear guide device of FIG. 1.
Figure 3:
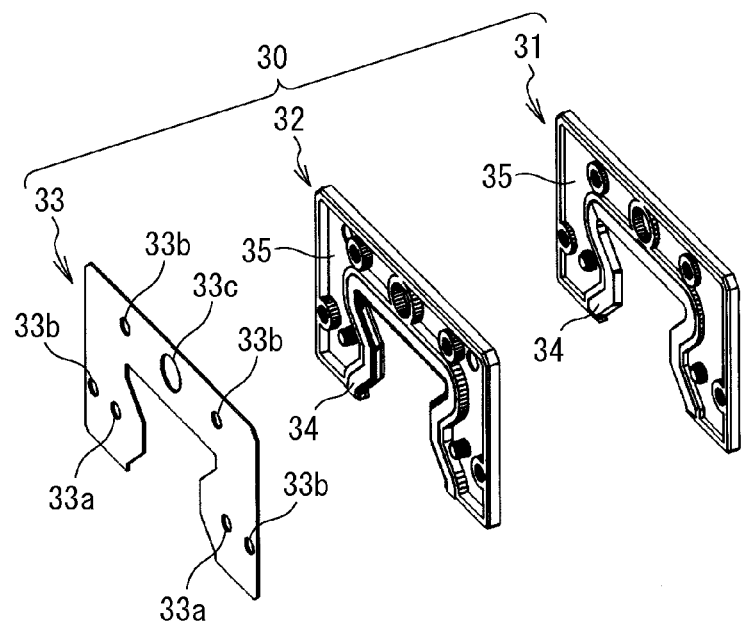
FIG. 3 is a perspective view illustrating a state where the side seal of the first embodiment is disassembled.

The guide rail 10 illustrated in FIG. 1, and the slider 20 including the slider body 21 and the end caps 22 are all the same as those of linear guide devices that are commonly used. The side seal 30 to be mounted to an axial end surface of the end cap 22 is unique to the present disclosure. The side seal 30, as illustrated in FIGS. 2 and 3, has a plurality (two in this embodiment) of seals 31 and 32 that overlap each other in the axial direction, that is, an inner seal 31 on the slider 20 side and an outer seal 32 on a side far from the slider 20. Moreover, the side seal 30 has a cover 33 that is arranged outside the outer seal 32 in the axial direction. The cover 33 is made of hard plates, such as a metal plate.

Figure 4:
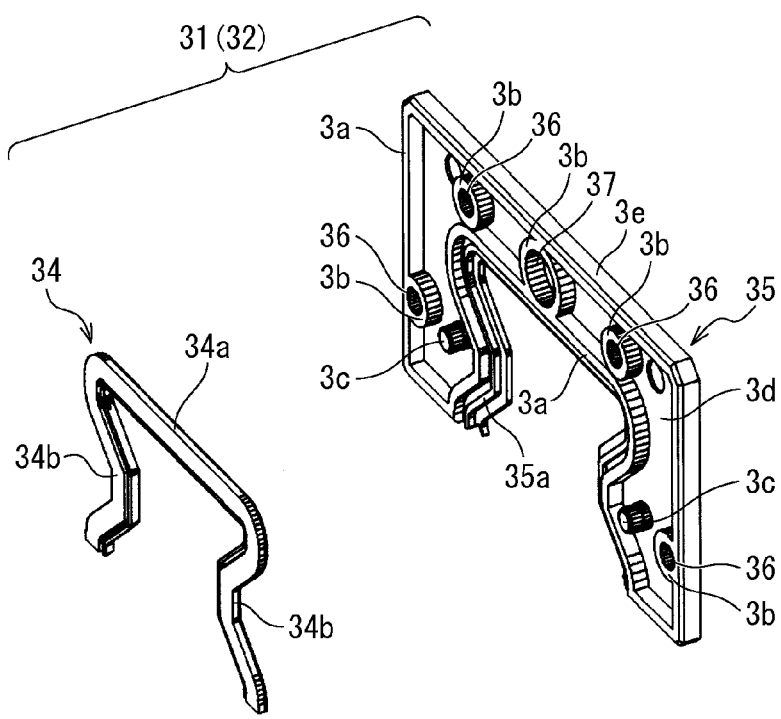
FIG. 4 is a perspective view illustrating a state where an inner seal and an outer seal that constitute the side seal of the first embodiment are disassembled.

As illustrated in FIGS. 3 and 4, both the seals 31 and 32 of the side seal 30 include a lip portion 34 in sliding contact with the guide rail 10, and a holder plate 35 configured to hold the lip portion 34. The holder plate 35 and the lip portion 34 are separate. The holder plate 35 holds the lip portion 34 and is mounted on the slider 20.

Figure 6A:
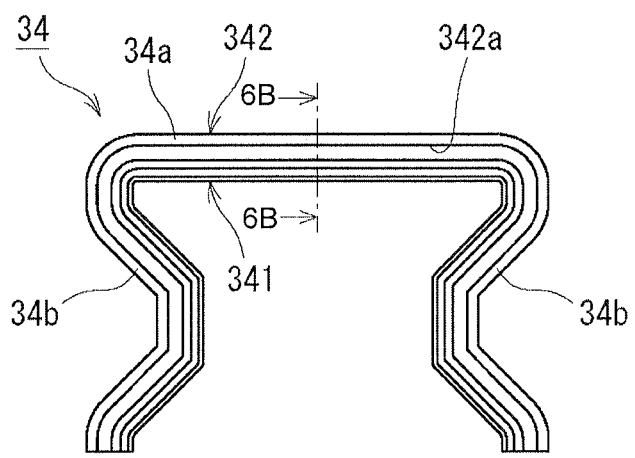
FIG. 6A is a front view illustrating a lip portion that constitutes the inner seal and the outer seal.
Figure 6B:
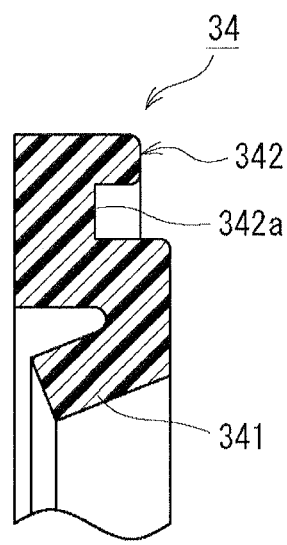
FIG. 6B is a cross-sectional view of the lip portion as seen along section line 6B-6B in FIG. 6A.

The lip portion 34, as illustrated in FIG. 4, includes an upper lip portion 34a that is arranged on the upper side of the guide rail, and lateral lip portions 34b that are respectively arranged on the left and right sides of the guide rail. FIG. 6A is a front view of the lip portion 34 viewed from a surface that is not seen in FIG. 4. FIG. 6B is an A-A cross-sectional view of FIG. 6A.

As illustrated in these drawings, the lip portion 34 includes a lip 341 that is brought into contact with the upper surface and both the side surfaces of the guide rail in directions in which the upper lip portion 34a and the lateral lip portions 34b face the guide rail, respectively, and a base portion 342 that is held by the holder plate 35. A recess 342a (an engaging portion that is engaged with the holder plate 35 by fitting of a protrusion and a recess) is formed on one surface of the base portion 342.

The lip portion 34 is made of soft resins, such as polyester-based elastomer. The holder plate 35 is made of hard resins, such as polyacetal resin and nylon.

A lip attachment portion 35a is formed in the shape having a protrusion and a recess (surface far from the slider 20) of the holder plate 35 near the guide rail 10. As a protrusion and a recess of the base portion 342 of the lip portion 34 fits to the lip attachment portion 35a, the lip portion 34 is held by the holder plate 35.

The holder plate 35 has thickness retention portions 3a and 3b that retain plate thickness, and a thin portion 3d that is thinner and has a lower rigidity than the thickness retention portions 3a and 3b. The axial dimensions of the seals 31 and 32 are respectively determined depending on the thicknesses of the thickness retention portions 3a and 3b. Additionally, the rigidity of the holder plate 35 is lowered by providing the thin portion 3d to partially reduce the thickness of the holder plate 35. Accordingly, the bending rigidity of the holder plate 35 becomes lower as compared to holder plates that do not have the thin portion 3d.

The thickness retention portion 3a is formed along an outer edge of the holder plate 35 by forming a recess serving as the thin portion 3d in one surface of the holder plate 35. The thickness retention portion 3a is provided on one surface of the outer edge of the thin portion 3d so as to protrude integrally therefrom in the shape of a frame. The thin portion 3d is blocked by the thickness retention portion 3a from the outside in the linear guide device in a state where the side seal 30 is attached.

Additionally, the thickness retention portion 3b is formed in an annular shape that surrounds the entire circumference of a hole 36 for allowing a fixing screw 4 (to be described below) to be inserted therethrough and a hole 37 that is bored in order to supply grease.

Both the thicknesses (heights from the thin portion 3d) of the respect thickness retention portions 3a and 3b are the same, and when compared with these retention portions, it is able to be said that the thin portion 3d is formed in a concave shape.

Figure 5:
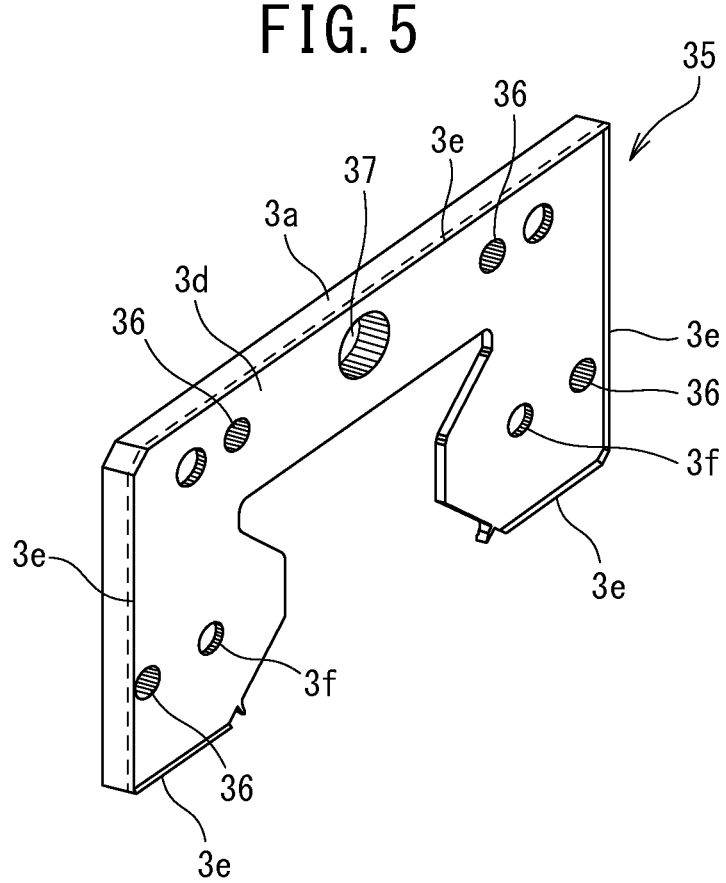
FIG. 5 is a perspective view of a holder plate that constitutes the inner seal and the outer seal when viewed from a back surface.

Meanwhile, in both the seals 31 and 32 of the side seal 30, when the surface of the holder plate 35 having the thickness retention portion 3a and the thin portion 3d is a front surface, a back surface opposite thereto, as illustrated in FIG. 5, is a flat surface except for a projection 3e (to be described below).

At the edge where there is the lip attachment portion 35a of the holder plate 35, the thickness retention portion 3a is provided along the lip attachment portion 35a on the side farther from the guide rail 10 than the lip attachment portion 35a, that is, inside the lip attachment portion 35a.

In this way, the thickness retention portion 3a is provided continuously at an upper edge, both left and right edges, and a lower edge of the holder plate 35, and the inside the lip attachment portion 35a. That is, the thickness retention portion 3a has such a form that the thin portion 3d is surrounded in the surface of the holder plate 35 perpendicular to a motion direction of the slider 20.

The projection 3e that protrudes from a plate surface is formed along the outer edge of the holder plate 35 on the surface of the holder plate 35 opposite to a surface where the thickness retention portions 3a and 3b are formed. The projection 3e is formed such that the thickness thereof is smaller toward a tip of the projection, and flexibility is given to the tip.

Additionally, projections 3c are formed on the thin portions 3d of the seals 31 and 32 of the side seal 30. In contrast, a recess 3f that is engaged with the projection 3c of the inner seal 31 is formed on the surface (surface on the inner seal 31 side) of the outer seal 32 opposite to the surface where the thickness retention portions 3a and 3b are formed. Additionally, a hole 33a that is engaged with the projection 3c of the outer seal 32 opens to the cover 33.

Through the engagement between the projection 3c and the recess 3f and the engagement between the projection 3c and the hole 33a, positioning of both the seals 31 and 32 and the cover 33 is performed and the plate thickness of the holder plate 35 is retained. Hence, the projection 3c also has the same function as that of the thickness retention portions 3a and 3b. Additionally, the cover 33 has a hole 33b through which the fixing screw 4 is inserted, and a hole 33c in which a grease nipple is mounted in order to supply grease.

Figure 9:
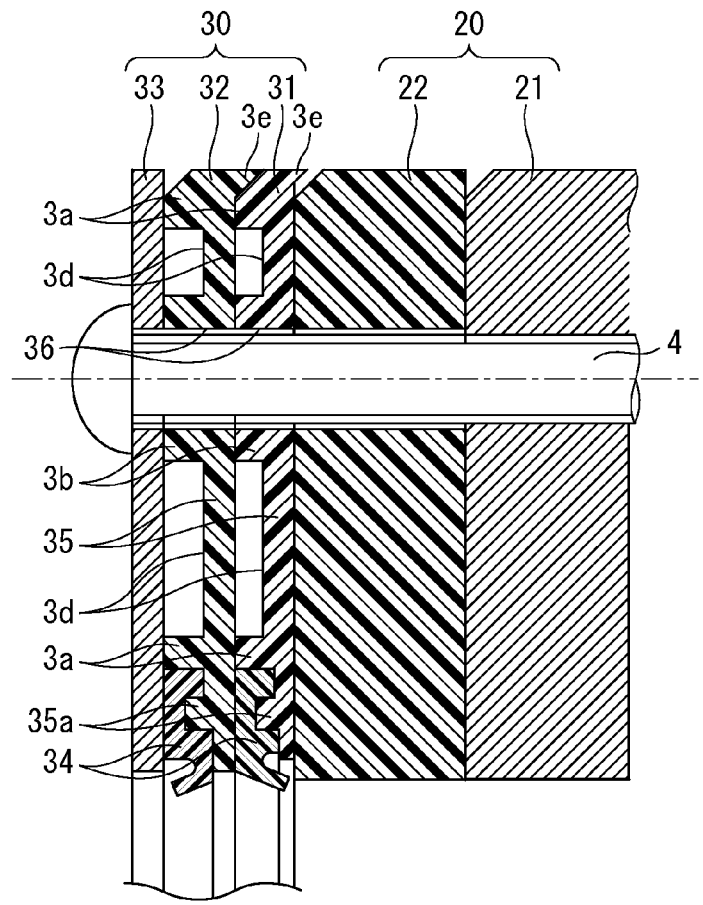
FIG. 9 is a cross-sectional view illustrating a state where the side seal is fixed to the slider in the first embodiment.

As illustrated in FIG. 7, the fixing screw 4 is inserted through the hole 33b of the cover 33 and the holes 36 of both the seals 31 and 32, and a tip portion of the fixing screw is inserted through a bolt insertion hole 22a of the end cap 22 of the slider 2, and is screwed to a female screw 21a of the slider body 21. Accordingly, the side seal 30 is fixed to an axial end portion of the slider 20 with the fixing screw 4. FIG. 9 illustrates this state.

In this case, the back surface of the inner seal 31 that is the flat surface comes into surface contact with an end surface of the slider 20, and the outer seal 32 comes into contact with the front surface of the inner seal 31, which has a protrusion and a recess . In this state, the back surface of the outer seal 32 abuts against a tip surface of the thickness retention portion 3a of the inner seal 31, and both the seals 31 and 32 are brought into close contact with each other. Additionally, the projection 3e at the edge of the back surface of the outer seal 32 comes into contact with the thickness retention portion 3a of the inner seal 31, and blocks a gap between a contact surface between both the seals 31 and 32, and the outside, at outer peripheral portions of both the seals 31 and 32.

Additionally, the flat cover 33 comes into contact with the front surface of the outer seal 32, which has a protrusion and a recess. The cover 33 also abuts against the tip surface of the thickness retention portion 3a of the outer seal 32, and the cover 33 and the outer seal 32 are also brought into close contact with each other.

Since a concave space formed by the thin portions 3d of both the seals 31 and 32 in this way is blocked by the thickness retention portion 3a and the outer seal 32 or the cover 33 that abuts against the thickness retention portion, foreign matter does not enter this space.

Additionally, even if foreign matter enters this space, there is the thickness retention portion 3b around the hole 36 through which the fixing screw 4 passes, and this thickness retention portion abuts against and comes into close contact with the back surface of the outer seal 32 or the cover 33, it is possible to prevent foreign matter included in the space of the thin portion 3d from further entering the inside of the slider 20 via the hole 36 through which the fixing screw 4 passes.

Moreover, even if foreign matter enters the space formed in the thin portion 3d, since there is also the thickness retention portion 3a between the space and the lip portion 34 and the thickness portion cuts off the inside and the outside of the space from each other, it is possible to prevent the foreign matter in the space from reaching the lip portion 34 and damaging the lip portion 34.

Additionally, in the side seal 30, when a warp has been caused as illustrated in FIG. 8 in the holder plates 35 of both the seals 31 and 32 due to contraction deformation after molding, the warp is corrected as follows. That is, the bending rigidity of the holder plate 35 becomes low in a direction in which the entire warp is corrected by the thin portions 3d. For this reason, if both the seals 31 and 32 and the cover 33 overlap each other, and the fixing screw 4 is fastened through the seals and the cover, the warp of the holder plate 35 is corrected by a fastening force. As illustrated in FIGS. 7 and 9, both the seals 31 and 32 are sandwiched between the end surface of the high-rigidity slider 20, and the cover 33, and these seals are brought into close contact with each other.

Therefore, even when a warp is caused in the holder plates 35 of the seals 31 and 32 in the side seal 30, the warp is effectively corrected, and a seal function is able to be sufficiently exhibited similar to when there is no warp.

Particularly, in this embodiment, in each of the seals 31 and 32, the thickness retention portion 3a is also provided inside the lip attachment portion 35a. Since the thickness retention portion 3a is formed of harder resin than the lip portion 34, even if the fastening force of the fixing screw 4 becomes excessive, the thickness retention portion 3a resist the fastening force, and thus, it is possible to prevent the lip portion 34 from being damaged or crushed. Hence, it is possible to give a sufficiently strong fastening force obtained by the fixing screw 4 for the purpose of correction of the warp of the holder plate 35.

Figure 10:
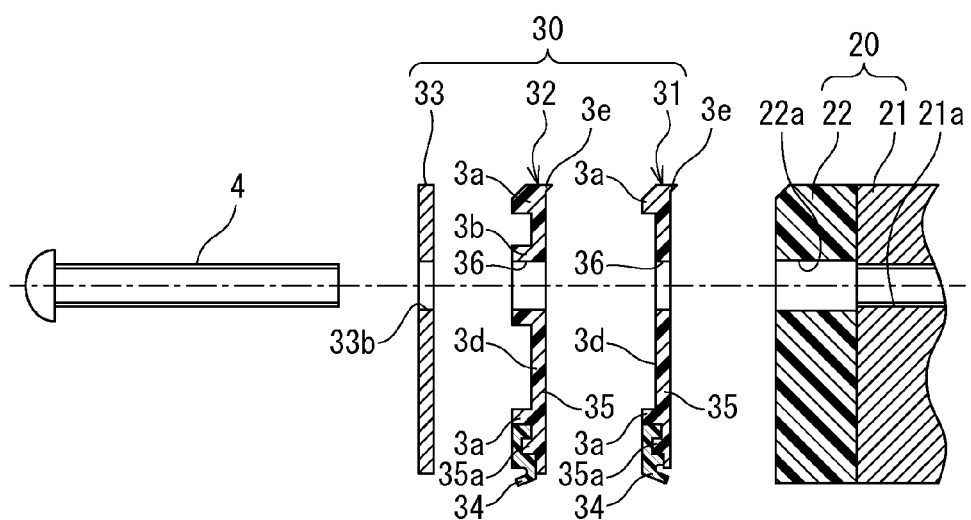
FIG. 10 is a cross-sectional view illustrating a method of fixing the side seal to the slider, in a second embodiment of the present disclosure.

FIG. 10 illustrates a second embodiment of the present disclosure. The thickness retention portion 3b is not formed in the inner seal 31 unlike the first embodiment. For this reason, the periphery of the hole through which the fixing screw 4 is inserted also becomes the thin portion 3d. That is, the outer seal 32 is easily warped to the inner seal 31 side since there is no thickness retention portion 3b in the inner seal 31. Therefore, it is avoided to strongly fasten the fixing screw 4 more than needed.

That is, the cover 33 abuts against the thickness retention portions 3a and 3b of the outer seal 32, the back surface of the outer seal 32 abuts against the thickness retention portion 3a of the inner seal 31, and the back surface of the inner seal 31 abuts against the end surface of the slider 20, whereby fastening is terminated in a stage where the warp of both the seals 31 and 32 is corrected.

Accordingly, it is possible to prevent the vicinity of the thickness retention portion 3b of the outer seal 32 from being warped to the inner seal 31 side due to the fastening of the fixing screw 4. In this embodiment, since the outer seal 32 is easily warped and the rigidity of the inner seal 31 becomes low since there is no thickness retention portion 3b, correction of the warp becomes easy in both the seals 31 and 32.

Figure 11:
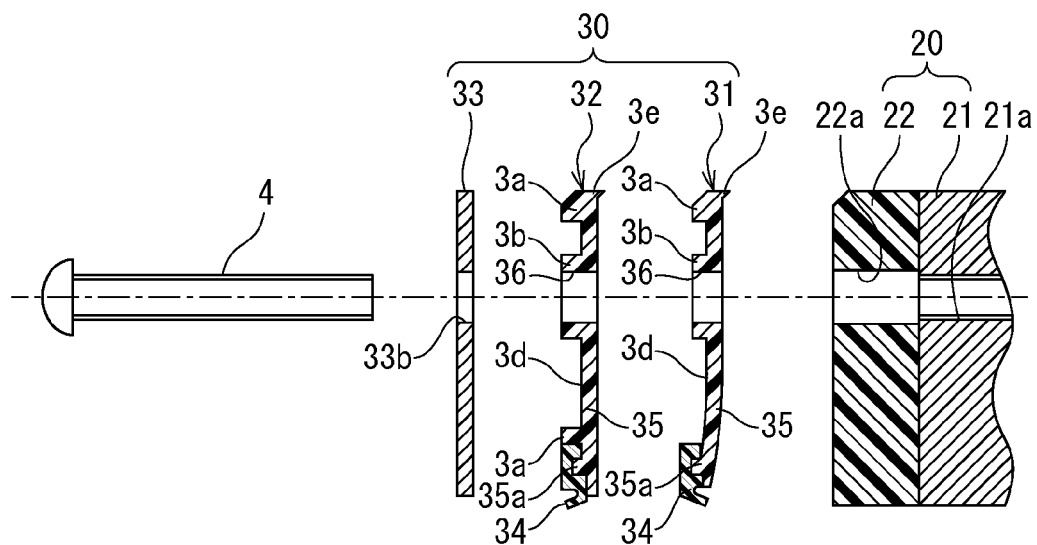
FIG. 11 is a cross-sectional view illustrating a case where there is a warp in a holder plate when the side seal is fixed to the slider in a third embodiment of the present disclosure.

FIG. 11 illustrates a third embodiment of the present disclosure. The holder plate 35 of the inner seal 31 that constitutes the side seal 30 of a third embodiment does not have the thickness retention portion 3a inside the lip portion 34 and the lip attachment portion 35a. That is, in the holder plate 35 of the inner seal 31, the thin portion 3d is continuously provided up to the lip attachment portion 35a. Accordingly, since the rigidity of the inner seal 31 decreases, the correction when the inner seal 31 is deflected becomes easy.

Figure 12:
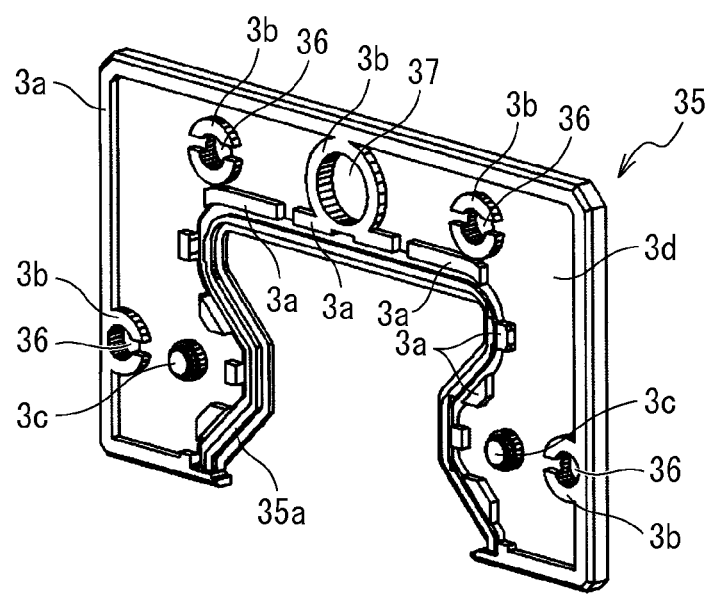
FIG. 12 is a perspective view illustrating the holder plate that constitutes the side seal of a fourth embodiment of the present disclosure.

FIG. 12 illustrates a fourth embodiment of the present disclosure. The holder plate 35 that constitutes the side seal of the fourth embodiment is different from the holder plate 35 that constitutes the side seal of a first embodiment in the shape of the thickness retention portions 3a and 3b. That is, the thickness retention portion 3a, which is continuously formed along the lip attachment portion 35a inside the lip attachment portion 35a in the holder plate 35 of the first embodiment, is divided in the holder plate 35 of the fourth embodiment. Additionally, the thin portion 3d is made to extend between the divided lip attachment portions 35a.

Additionally, in the holder plate 35 of the first embodiment, the thickness retention portion 3b around the hole 36 for allowing the fixing screw 4 to be inserted therethrough and the hole 37 that supplies grease are annularly formed so as to surround the holes 36 and 37. However, in the holder plate 35 of this fourth embodiment, the annular thickness retention portion 3b is divided halfway into a discontinuous state, and the thin portion 3d is made to extend between the divided thickness retention portions.

According to the holder plate 35 of this embodiment, even the divided thickness retention portions 3a and 3b are able to sufficiently withstand fastening using the fixing screw 4, and the rigidity of the seals 31 and 32 decreases by the portion of the thin portion 3d that increased by the division. Therefore, correction of the warp of the holder plates 35 of the seals 31 and 32 becomes easy.

Figure 13:
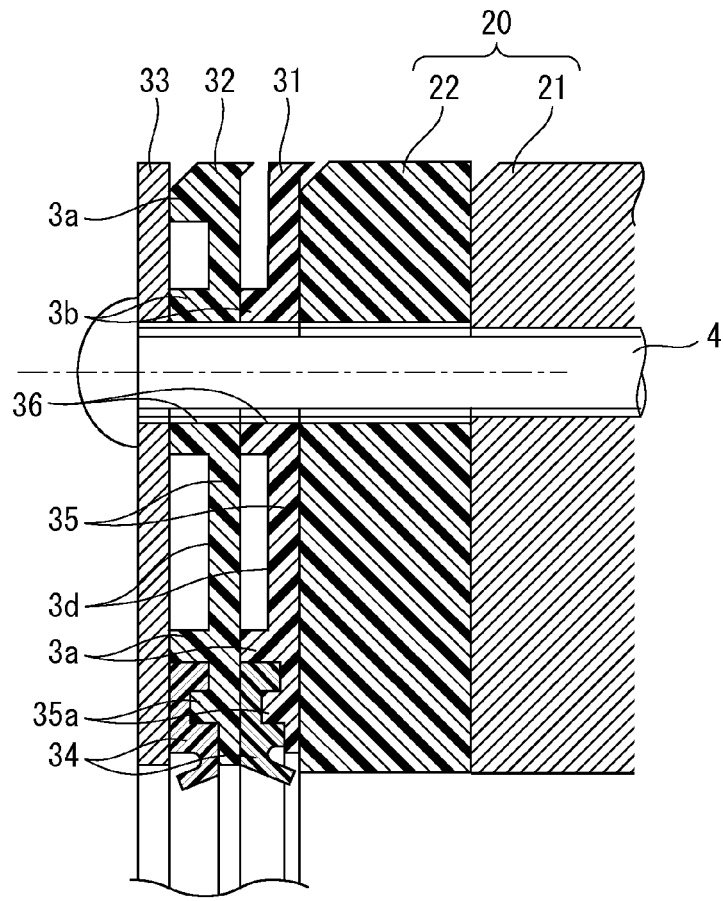
FIG. 13 is a cross-sectional view illustrating a state where a side seal is fixed to a slider, in a first comparative example.

In a side seal of the first comparative example illustrated in FIG. 13, the holder plate 35 of the outer seal 32 has the thickness retention portion 3a each of at the outer edge portion and inside the lip attachment portion 35a, but the holder plate 35 of the inner seal 31 has no thickness retention portion at an outer edge portion. That is, in the holder plate 35 of the inner seal 31, the thin portion 3d reaches the outer edge portion. For this reason, foreign matter enters between both the seals 31 and 32 from the outer edge of the holder plate 35 of the inner seal 31.

Since warps of respective seals affect each other particularly in the case of the side seal equipped with a plurality of seals as in this comparative example, gaps are easily formed between the respective seals. In contrast, in the side seals of the respective embodiments of the present disclosure, there is no entering of foreign matter as described above.

Figure 14:
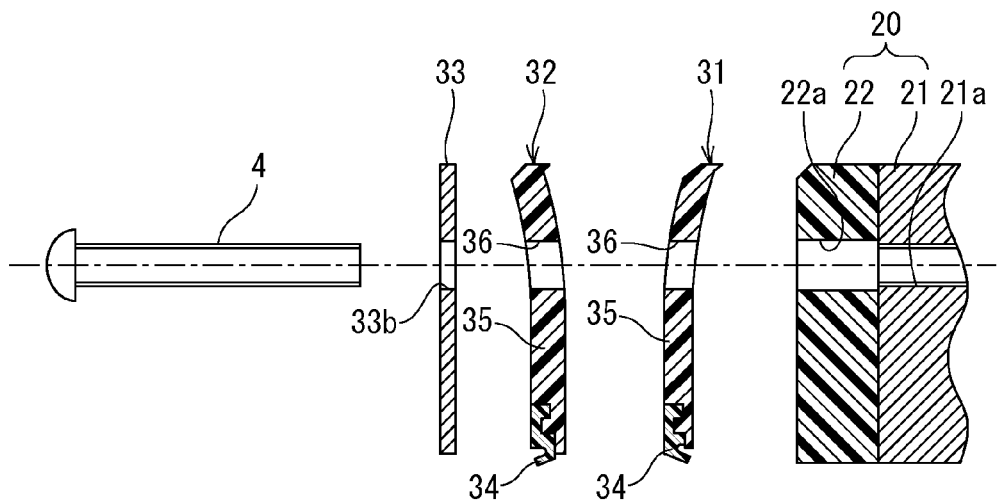
FIG. 14 is a cross-sectional view illustrating a case where there is a warp in a holder plate when a side seal is fixed to a slider, in a second comparative example.
Figure 15:
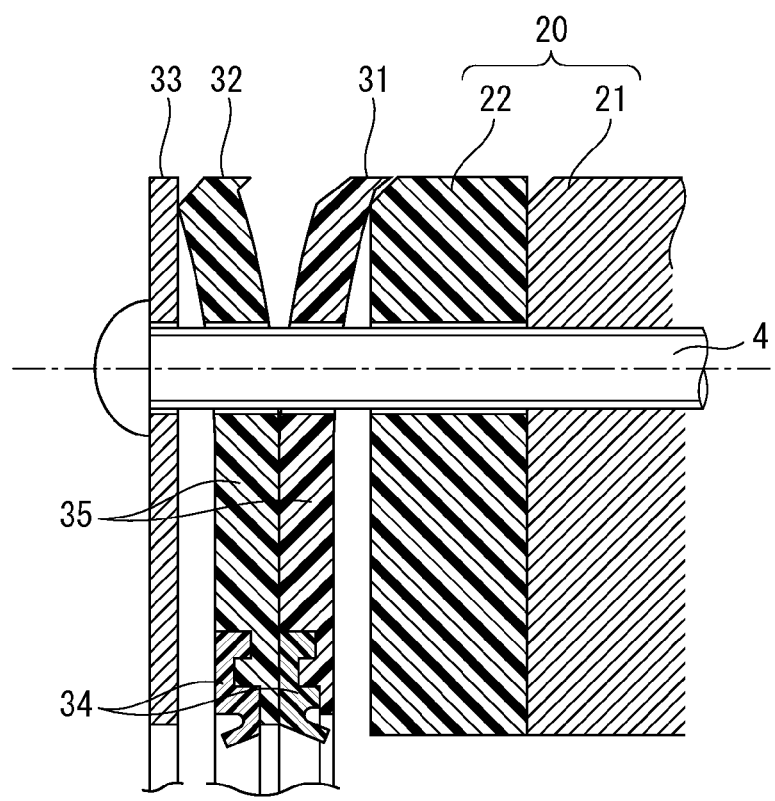
FIG. 15 is a cross-sectional view illustrating a state where the side seal is fixed to the slider, in a second comparative example.

In a side seal of a second comparative example illustrated in FIGS. 14 and 15, the holder plates 35 of both the seals 31 and 32 have no thin portion, but the entirety of holder plates 35 become thickness retention portions. For this reason, since the rigidity of the holder plate 35 made of hard synthetic resin is maintained as it is, if warp is generated in the holder plate 35, the warp is not able to be easily corrected by fastening using the fixing screw 4.

That is, as illustrated in FIG. 15, after the side seal is fastened with the fixing screw 4, gaps are generated between the slider 20 and the inner seal 31, between both the seals 31 and 32, and between the cover 33 and the outer seal 32. Accordingly, the seal function degrades. In contrast, in the respective embodiment of the present disclosure, even when a plurality of seals are included, the warp of the holder plate 35 is easily corrected and the seal function is secured.

Although the present disclosure have been described using the embodiments and the comparative examples, the number of seals that constitute the side seal of the present disclosure is not necessarily two, and may be one or may be three or more.

Figure 16:
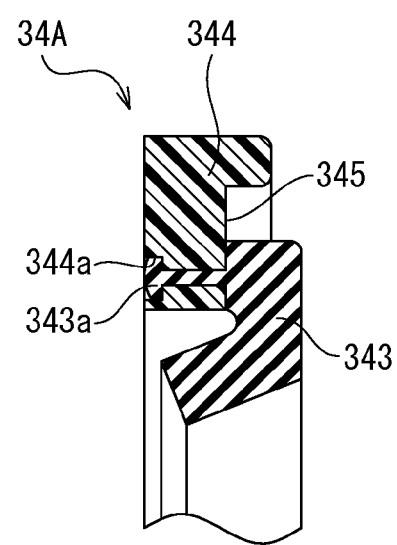
FIG. 16 is a cross-sectional view illustrating another example of the lip portion that constitutes the side seal, and is a view equivalent to the A-A cross-sectional view of FIG. 6A.

Additionally, as the lip portion that constitutes the seal, a lip 343 and a base portion 344 may be formed of separate materials as in a lip portion 34A illustrated in FIG. 16. For example, the lip 343 of the lip portion 34A is able to be made of rubber or made of a soft resin material, and the base portion 344 is able to be made of hard resin or metal.

The lip portion 34A, which includes the base portion 344 made of hard resin and the lip 343 made of rubber and is obtained by an insert molding method, is illustrated in FIG. 16. The lip 343 and the base portion 344 are combined together by combining both portions 343a and 344a. A recess (engaging portion engaged with the holder plate 35 by fitting of a protrusion and a recess) 345 is formed between the base portion 344 and the lip 343.

REFERENCE SIGNS LIST 3a, 3b: thickness retention portion
3d: thin portion
3e: projection
10: guide rail
20: slider
21: slider body
22: end cap
30: side seal
31: inner seal
32: outer seal
33: cover
34: lip portion
35: holder plate
35a: lip attachment portion

The invention claimed is:
1. A linear guide device comprising:
a guide rail; a slider; and a plurality of rolling elements,
wherein the guide rail and the slider have rolling contact surfaces that are arranged to face each other and form a rolling passage for the rolling elements,
the slider is configured to move linearly with respect to the guide rail via the rolling elements that roll in the rolling passage, a side seal having a lip portion in sliding contact with the guide rail is arranged at each of both ends of the slider in a motion direction, the side seal has one or a plurality of seals, the seal has the lip portion, and a holder plate made of hard resin configured to hold the lip portion and to be mounted on the slider, the holder plate has a thickness retention portion configured to retain plate thickness, and a thin portion that is thinner and has a lower rigidity than the thickness retention portion, the thickness retention portion is formed along at least a portion of an outer edge of the holder plate where there is not the lip portion, the thin portion is blocked by the thickness retention portion from the outside, the holder plate has a hole through which a fixing screw for fixing the seal to the slider is inserted, a thickness retention portion configured to retain the thickness of the holder plate is formed also around the hole, and the thickness retention portion around the hole has the same thickness as the thickness retention portion at the outer edge, and is formed in a shape configured to partially surround the circumference of the hole.

2. The linear guide device according to claim 1, wherein the holder plate and the lip portion are separately formed, wherein the lip portion is held by a lip attachment portion formed at the edge of the holder plate near the guide rail, and wherein the thickness retention portion is formed along the lip attachment portion and inside the lip attachment portion at the edge of the holder plate where there is the lip attachment portion.

3. The linear guide device according to claim 1, wherein the side seal has one or a plurality of seals and a cover, wherein the cover includes a plate of a hard resin and is arranged at a position farther from the slider than the seal, and wherein the side seal is fixed to the slider with a fixing screw that passes through the cover and the seal and is screwed to the slider.

4. The linear guide device according to claim 1, wherein the side seal has a plurality of the seals, and the seals are arranged so as to come into contact with each other in the motion direction of the slider.

5. The linear guide device claim 1, wherein the thickness retention portion and the thin portion are formed by forming a recess in one surface of two surfaces of the holder plate perpendicular to the motion direction of the slider, and the other surface is a flat surface.

6. The linear guide device according to claim 5, wherein a projection that protrudes in a direction separated from the flat surface is provided along an outer edge of the flat surface of the holder plate.

* * * * *